(No Model.)
L. SMITH.
ADJUSTABLE CURVED PIPE SECTION.
No. 396,773. Patented Jan. 29, 1889.
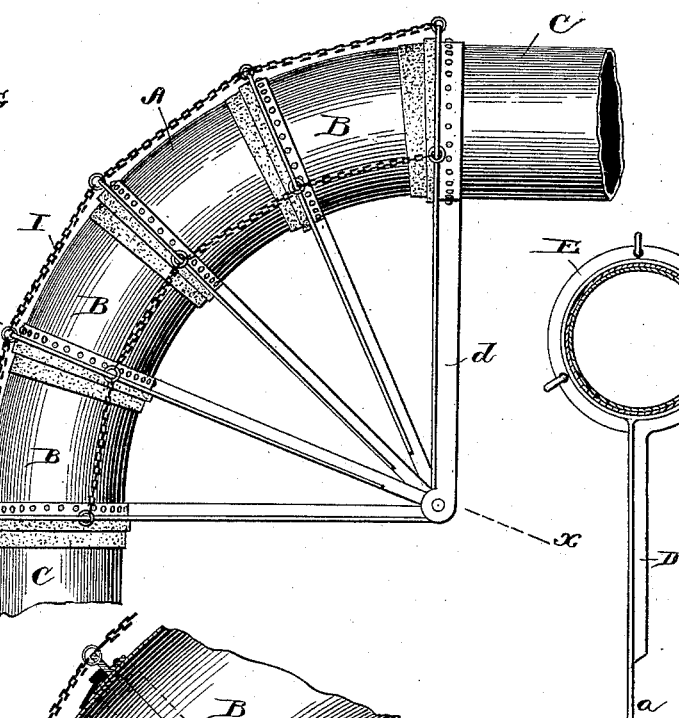
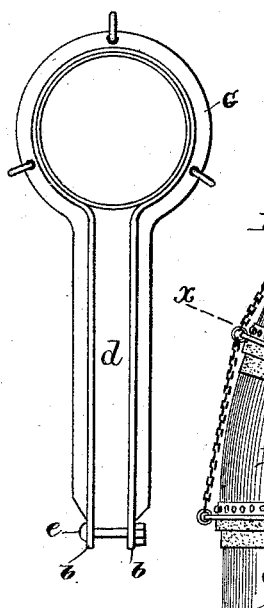
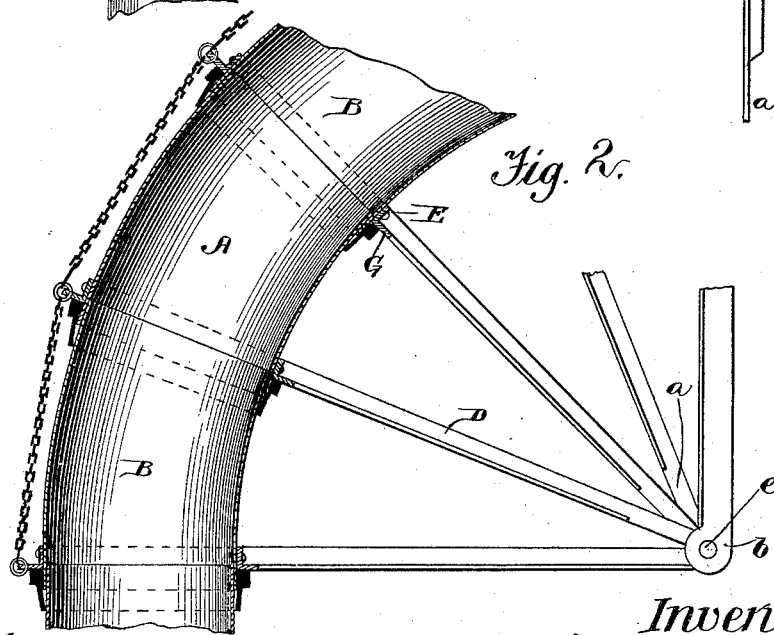
Witnesses.
A. Ruppert.
H. E. Peck.
Inventor:
Lyman Smith
per O. E. Duffy
Atty.

UNITED STATES PATENT OFFICE.

LYMAN SMITH, OF KANSAS CITY, MISSOURI.

ADJUSTABLE CURVED PIPE-SECTION.

SPECIFICATION forming part of Letters Patent No. 396,773, dated January 29, 1889.

Application filed February 17, 1888. Serial No. 264,394. (No model.)

*To all whom it may concern:*

Be it known that I, LYMAN SMITH, of Kansas City, in the county of Jackson and State of Missouri, have invented certain new and useful Improvements in Adjustable Curved Pipe Sections or Elbows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to improvements in my general apparatus for transferring grain and other material of broken-lump formation, and is an important attachment for the successful manipulation of the apparatus shown in an application filed by me February 17, 1888, Serial No. 264,395.

The object of my invention is to avoid certain difficulties heretofore encountered in the manipulation of the pipes or conduits used in this class of apparatus, and to insure a better and more reliable operation than heretofore; and with these ends in view the invention consists in certain novel features of construction and combinations of parts, more fully described hereinafter, and particularly pointed out in the claims.

Figure 1 represents an elevation of my improved movable sectional elbow or curved sectional conduit; Fig. 2, a partial sectional view of the same; Fig. 3, an end view of the pipe and its radial supports or braces; and Fig. 4, a cross-section of the pipe-joint, taken on the line $xx$ of Fig. 1, clearly showing the brace in a closed position around the pipe-section.

Before referring by letter to the details of construction it will be observed that the full curved section or elbow is held in its various positions by radial arms or supports extending from a common center, so that no matter how the minor sections of the curved pipe or elbow are adjusted they will be held in the desired position against displacement. These radial supporting-arms, while rigidly attached to the minor sections of the pipe or elbow, are nevertheless capable of movement to and from each other as the positions of said minor sections are changed. One of these radial supports forms a yoke and is provided with bosses on its ends, between which the other radial arms are secured; but it is preferred that each arm-support be double from its encircling ring to the common center. The rings of each arm are rigidly fixed, preferably riveted, to the minor sections of the elbow, and as the said sections slide into each other telescopically the radial arms approach each other, by which the said sections are permitted to change the length of the adjustable elbow to suit the manipulations of the workmen.

In the drawings, A is the curved adjustable pipe section or elbow as a whole, and B the minor sections of the same; C, the conduit, to which the curved portion is connected.

D are the radial arms or supports, provided with rings E. These arms and rings are preferably made of angle-iron, the angle serving to strengthen the arm and the ring. The projecting portion of the angle-iron G is also made to serve the purpose of holding the stay-chains I. The function of the stay-chains is to prevent the minor sections forming the elbow from pulling apart, while they yield when said sections are sliding into each other. While these minor sections making up the main section are snugly fitted, they are not air-tight, and in order to make them air-tight I form around them a flexible elastic packing-ring secured in such manner that when they recede from or advance to each other the packing will yield and slide on the ring. Should there be by any possibility a leak in the joint, the vacuum within the pipe draws the elastic material or packing closer to the joint, and thus the leak is stopped.

The main radial supporting-arm $d$ of the series of radial arms D is made larger and stronger than the others and is provided with the bosses $b$, forming a yoke in which the ends $a$ of the remaining radial arms D are pivoted by means of a bolt, $e$, forming a pivot upon which said arms turn.

It will be observed that the radial supporting-arm hold the adjustable elbow in shape and position by reason of the fact that they are pivoted together at their corresponding ends and thus extend radially and from a common center to the elbow, thereby equalizing and distributing the weight, and it should also be observed that each minor section is provided with a radial supporting-arm.

In constructing the minor sections B each one of said minor sections is made longitudinally curved, or with their outer sides longer than their inner sides, so that each minor section will form a segment of the circle, having the pivotal point of the ends of the radial supporting-arms as its center. Thus it will be seen that however the minor sections are adjusted the curved elbow will form a segment of said circle.

It is evident that various slight changes might be resorted to in the form and arrangement of the various parts described without departing from the spirit and scope of my invention; hence I do not wish to limit myself strictly to the precise construction herein set forth, but consider myself entitled to all such changes as fall within the spirit and scope of my invention.

Having thus described my invention, what I claim as new, and desire to secure by Letters Patent, is—

1. The herein-described curved pipe-section or elbow, consisting, essentially, of a series of movable minor sections and radial supporting-arms, as set forth.

2. In an adjustable curved pipe section or elbow, the combination, with the minor sections telescopically connected, of the radial supporting-arms pivoted at a common center, substantially as described.

3. An adjustable curved pipe section or elbow composed of a series of minor sections, each provided with a radial supporting-arm, substantially as described.

4. The combination, with a movable curved pipe section or elbow, of a series of radial arms secured together at a common center and supporting the elbow or pipe section, substantially as described.

5. The combination of the minor pipe-sections telescopically connected, the radial supporting-rods, and the stay-chains connecting said sections, substantially as described.

6. A curved pipe-section capable of adjustment and provided with radial arms having rings and packing-rings, substantially as set forth.

7. The combination, in a curved pipe-section, of the minor sections movably connected, and the radial supporting-arms having rings embracing said minor sections, said arms being pivoted and extending from a common center, substantially as described.

8. An adjustable curved pipe-section comprising minor sections, radial supporting-arms having rings formed of angle-iron and embracing the minor sections, and stay-chains connecting the sections and secured to said rings.

9. In an adjustable pipe-section, the combination, with the minor sections and supporting-arms provided with rings formed of angle-iron, of the packing-rings carried by the angle-iron rings.

10. In an adjustable curved pipe-section, the combination of the minor sections and the radial supporting-arms having rings, one of said arms being provided with lugs, between which the remaining arms are pivotally secured by a bolt or pivot.

In testimony that I claim the foregoing as my own I affix my signature in presence of two witnesses.

LYMAN SMITH.

Witnesses:
HUBERT E. PECK,
J. C. STODDARD.